US012731498B2

(12) United States Patent
Prosser

(10) Patent No.: US 12,731,498 B2
(45) **Date of Patent: *Sep. 8, 2026**

(54) AIRCRAFT FLIGHT ENVELOPE PROTECTION AND RECOVERY AUTOPILOT

(71) Applicant: Gulfstream Aerospace Corporation, Savannah, GA (US)

(72) Inventor: Kevin Prosser, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/766,034

(22) Filed: Jul. 8, 2024

(65) Prior Publication Data

US 2024/0363013 A1 Oct. 31, 2024

Related U.S. Application Data

(63) Continuation of application No. 18/155,335, filed on Jan. 17, 2023, now Pat. No. 12,033,526, which is a (Continued)

(51) Int. Cl.
*B64C 13/16* (2006.01)
*B64C 13/18* (2006.01)
(Continued)

(52) U.S. Cl.
CPC .............. *G08G 5/74* (2025.01); *B64C 13/18* (2013.01); *B64D 43/00* (2013.01); (Continued)

(58) Field of Classification Search
CPC .... G05D 1/0061; G05D 1/101; G05D 1/0676; G05D 1/0083; G05D 1/00; G05D 1/0825; (Continued)

(56) References Cited

U.S. PATENT DOCUMENTS 4,390,949 A * 6/1983 Beningfield ............ G01S 1/026 701/17
4,573,925 A * 3/1986 Styers ...................... G09B 9/16 345/23

(Continued)

FOREIGN PATENT DOCUMENTS

CN 105843042 A * 8/2016 ........... G05B 13/042
DE 102010021676 A1 * 12/2011 ............... G09B 9/28

(Continued)

*Primary Examiner* — Yuri Kan
(74) *Attorney, Agent, or Firm* — Ingrassia Fisher & Lorenz, LLP

(57) ABSTRACT

Systems and vehicle are provided. A flight envelope protection system includes: a potential path generation module configured to generate a plurality of possible recovery trajectories for the aircraft; a trajectory selection module configured to select a possible recovery trajectory; a trajectory flight condition module configured to estimate a flight condition of the aircraft along the potential aircraft path of the selected possible recovery trajectory; a limit comparison module configured to determine whether the modeled flight condition violates an aircraft limit; and a recovery autopilot module configured to guide the aircraft along one of the plurality of possible recovery trajectories.

20 Claims, 2 Drawing Sheets

Related U.S. Application Data continuation of application No. 17/248,319, filed on Jan. 20, 2021, now Pat. No. 11,580,865, which is a continuation of application No. 16/250,240, filed on Jan. 17, 2019, now Pat. No. 10,930,164, which is a continuation of application No. 15/470,776, filed on Mar. 27, 2017, now Pat. No. 10,228,692.

(51) Int. Cl.

| | |
|---|---|
| ***B64D 43/00*** | (2006.01) |
| ***B64D 45/00*** | (2006.01) |
| ***G05D 1/00*** | (2024.01) |
| ***G05D 1/08*** | (2006.01) |
| ***G05D 1/81*** | (2024.01) |
| ***G06N 3/00*** | (2023.01) |
| ***G08G 5/00*** | (2025.01) |
| ***G08G 5/02*** | (2006.01) |
| ***G08G 5/04*** | (2006.01) |
| ***G08G 5/21*** | (2025.01) |
| ***G08G 5/54*** | (2025.01) |
| ***G08G 5/74*** | (2025.01) |
| ***G08G 5/76*** | (2025.01) |
| ***G08G 5/80*** | (2025.01) |

(52) U.S. Cl.

CPC ....... *B64D 45/0005* (2013.01); *G05D 1/0825* (2013.01); *G05D 1/81* (2024.01); *G06N 3/00* (2013.01); *G08G 5/21* (2025.01); *G08G 5/54* (2025.01); *G08G 5/76* (2025.01); *G08G 5/80* (2025.01); *B64D 2045/0085* (2013.01)

(58) Field of Classification Search

CPC .. G05D 1/0692; G05D 1/0816; G01C 23/005; G01C 23/00; G01C 5/005; G01C 21/3469; G01C 21/3407; B64C 13/16; B64C 13/18; G08G 5/00; G08G 5/025; G08G 5/0086; G08G 5/74; G08G 5/21; G08G 5/0039; G09B 9/28; G09B 9/16; G05B 13/042; G01S 1/026; A01B 69/004; F42B 10/663

See application file for complete search history.

(56) References Cited

U.S. PATENT DOCUMENTS

| | | | | |
|---|---|---|---|---|
| 5,053,969 | A * | 10/1991 | Booth | G05D 1/0692 701/11 |
| 5,377,937 | A * | 1/1995 | LaMay | G05D 1/0676 244/185 |
| 6,236,914 | B1 * | 5/2001 | Kaloust | G05D 1/0816 701/34.2 |
| 6,246,929 | B1 * | 6/2001 | Kaloust | G05D 1/0816 701/5 |
| 6,480,120 | B1 * | 11/2002 | Meunier | G01C 5/005 340/961 |
| 10,228,692 | B2 * | 3/2019 | Prosser | G08G 5/0086 |
| 10,930,164 | B2 * | 2/2021 | Prosser | G05D 1/0825 |
| 11,580,865 | B2 * | 2/2023 | Prosser | G05D 1/0061 |
| 12,033,526 | B2 * | 7/2024 | Prosser | G08G 5/74 |
| 2002/0161489 | A1 * | 10/2002 | Johnson | G05D 1/101 701/4 |
| 2004/0059474 | A1 * | 3/2004 | Boorman | G01C 23/00 701/14 |
| 2008/0133120 | A1 * | 6/2008 | Romanick | G01C 21/3469 701/123 |
| 2009/0150008 | A1 * | 6/2009 | Villaume | G05D 1/0083 701/3 |
| 2010/0217461 | A1 * | 8/2010 | Ledesma | G05D 1/0676 701/18 |
| 2010/0324772 | A1 * | 12/2010 | Aral | A01B 69/004 701/25 |
| 2014/0121863 | A1 * | 5/2014 | Barraci | G01C 23/00 701/14 |
| 2016/0063867 | A1 * | 3/2016 | Zammit | G08G 5/54 701/18 |
| 2016/0096616 | A1 * | 4/2016 | Li | B64C 13/16 701/3 |
| 2016/0231743 | A1 * | 8/2016 | Bendewald | G01C 21/3407 |
| 2017/0038223 | A1 * | 2/2017 | Toumazet | G01C 23/005 |
| 2018/0088594 | A1 * | 3/2018 | Moon | B64C 13/18 |

FOREIGN PATENT DOCUMENTS

| | | | | |
|---|---|---|---|---|
| EP | 0747655 | A2 * | 12/1996 | F42B 10/663 |
| WO | WO-2016111594 | A1 * | 7/2016 | B64C 13/18 |

* cited by examiner

AIRCRAFT FLIGHT ENVELOPE PROTECTION AND RECOVERY AUTOPILOT

CROSS-REFERENCE TO RELATED APPLICATIONS

This application is a continuation of U.S. patent application Ser. No. 18/155,335 filed Jan. 17, 2023, which is a continuation of U.S. patent application Ser. No. 17/248,319 filed Jan. 20, 2021, which is a continuation of U.S. patent application Ser. No. 16/250,240 filed on Jan. 17, 2019, which is a continuation of U.S. patent application Ser. No. 15/470,776 filed on Mar. 27, 2017. The disclosure of the above applications are incorporated herein by reference.

TECHNICAL FIELD

The present disclosure generally relates to aircraft flight envelope protection systems, and more particularly relates to aircraft flight envelope protections systems that model potential aircraft trajectories and test the trajectories for aircraft limit violations.

BACKGROUND

Aircraft are designed to operate within certain operating speeds and loads on control surfaces of the aircraft. These operating limits are known as the flight envelope, outside of which there may be damage or loss of control of the aircraft. In order to protect against operating outside of the flight envelope, conventional aircraft utilize many disparate systems that evaluate individual aspects of the aircraft to determine whether the aircraft is operating outside of the flight envelope or is likely to collide with the ground on the present flight path. These conventional systems, however, have limitations that prevent full envelope protection.

Furthermore, these conventional systems are often disabled for landing based on whether the landing gear is down or by pilot command. Disabling the systems for landing, however, causes the aircraft to lose flight envelope protection during the landing.

Accordingly, it is desirable to provide systems and aircraft that provide greater flight envelope protection during flight and during landing phases. Furthermore, other desirable features and characteristics of the present invention will become apparent from the subsequent detailed description and the appended claims, taken in conjunction with the accompanying drawings and the foregoing technical field and background.

SUMMARY

Systems and aircraft are provided for flight envelope protection. In a first non-limiting embodiment, an avionics system includes, but is not limited to, a trajectory selection module configured to select a potential aircraft path relative to a current aircraft flight condition; a trajectory flight condition module configured to estimate a modeled flight condition of the aircraft along the potential aircraft path; a limit comparison module configured to determine whether the modeled flight condition violates aircraft limits; and a violation indicator module configured to generate an indication of impending violation.

In a second non-limiting embodiment, an aircraft includes, but is not limited to, a sensor system configured to provide aircraft flight condition data, an actuator system configured to manipulate control surfaces of the aircraft, and a control system. The control system includes: a trajectory selection module configured to select a potential aircraft path relative to a current aircraft flight condition; a trajectory flight condition module configured to estimate a modeled flight condition of the aircraft along the potential aircraft path; a limit comparison module configured to determine whether the modeled flight condition violates an aircraft limit; and a violation indicator module configured to generate an indication of impending violation.

BRIEF DESCRIPTION OF THE DRAWINGS

Advantages of the present invention will be readily appreciated, as the same becomes better understood by reference to the following detailed description when considered in connection with the accompanying drawings wherein.

DETAILED DESCRIPTION

Figure 1:
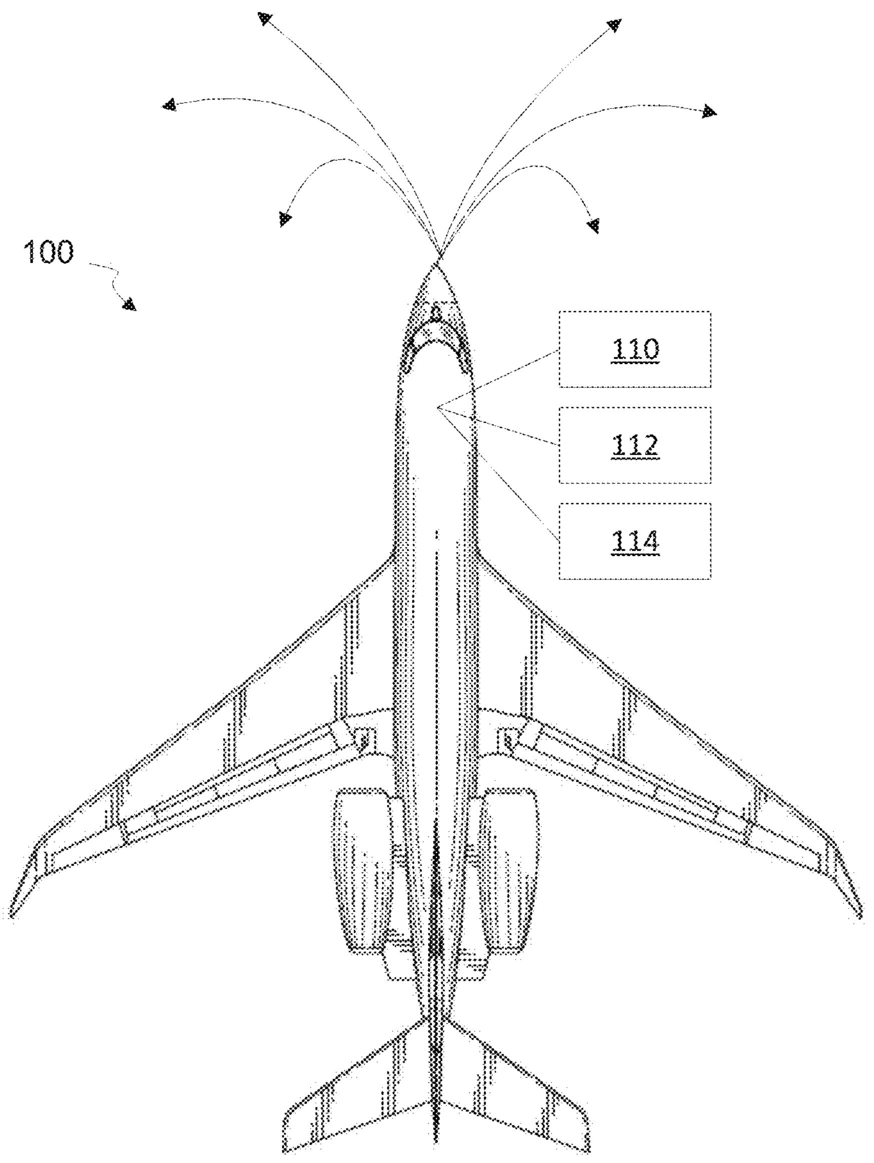
FIG. 1 is a schematic diagram illustrating an aircraft having a control system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Various embodiments disclosed herein describe systems that implement a Trajectory Prediction Algorithm (TPA) and a Recovery Autopilot. The TPA models various possible recovery trajectories and tests those trajectories against the aircraft limits and terrain clearance. The recovery trajectories represent flight paths that will potentially guide the aircraft away from impending aircraft limit violations or terrain conflicts. If a trajectory violates a limit, the trajectory will be ruled out and not used. When only one possible recovery is available and that recovery is approaching a limit, the TPA will trigger the Recovery Autopilot to initiate that recovery and thereby avoid the impending envelope exceedance or terrain conflict. Multiple trajectories are utilized to avoid false warnings. For example, if a right turn could be used to avoid terrain but the system does not model right turns, the system will trigger a recovery when the straight-ahead trajectory intersects the terrain. If the crew was safely planning the right turn, it would be a nuisance that the system activated unnecessarily when a safe route existed. The TPA models the recovery beginning from the current aircraft state using current aircraft performance capability. For example, the TPA uses energy modeling that is based on ambient temperature and engine failure status. The Recovery Autopilot takes control of the aircraft and executes the directed recovery once triggered.

Referring now to FIG. 1, an example of an aircraft 100 is illustrated in accordance with some embodiments. Aircraft 100 includes a control system 110, a sensor system 112, and an actuator system 114, among other systems. Although aircraft 100 is described in this description as an airplane, it should be appreciated that control system 110 may be utilized in other aircraft, land vehicles, water vehicles, space vehicles, or other machinery without departing from the scope of the present disclosure. For example, control system 110 may be utilized in submarines, helicopters, airships, spacecraft, or automobiles.

Control system 110 is an avionics system configured to operate aircraft 100 and to evaluate various trajectories 120*a-f*, as will be described in further detail below. Sensor system 112 includes one or more sensing devices that sense observable conditions of the exterior environment, the interior environment of aircraft 100, or operational conditions and status of aircraft 100. For example, sensor system 112 may include accelerometers, gyroscopes, RADARs, LIDARs, global positioning systems, optical cameras, thermal cameras, ultrasonic sensors, and/or other sensors.

Actuator system 114 includes one or more actuator devices that control one or more vehicle features. For example, actuator system 114 may include actuators that manipulate control surfaces on aircraft 100, extend or retract landing gear of aircraft 100, an/or move other components of aircraft 100.

Figure 2:
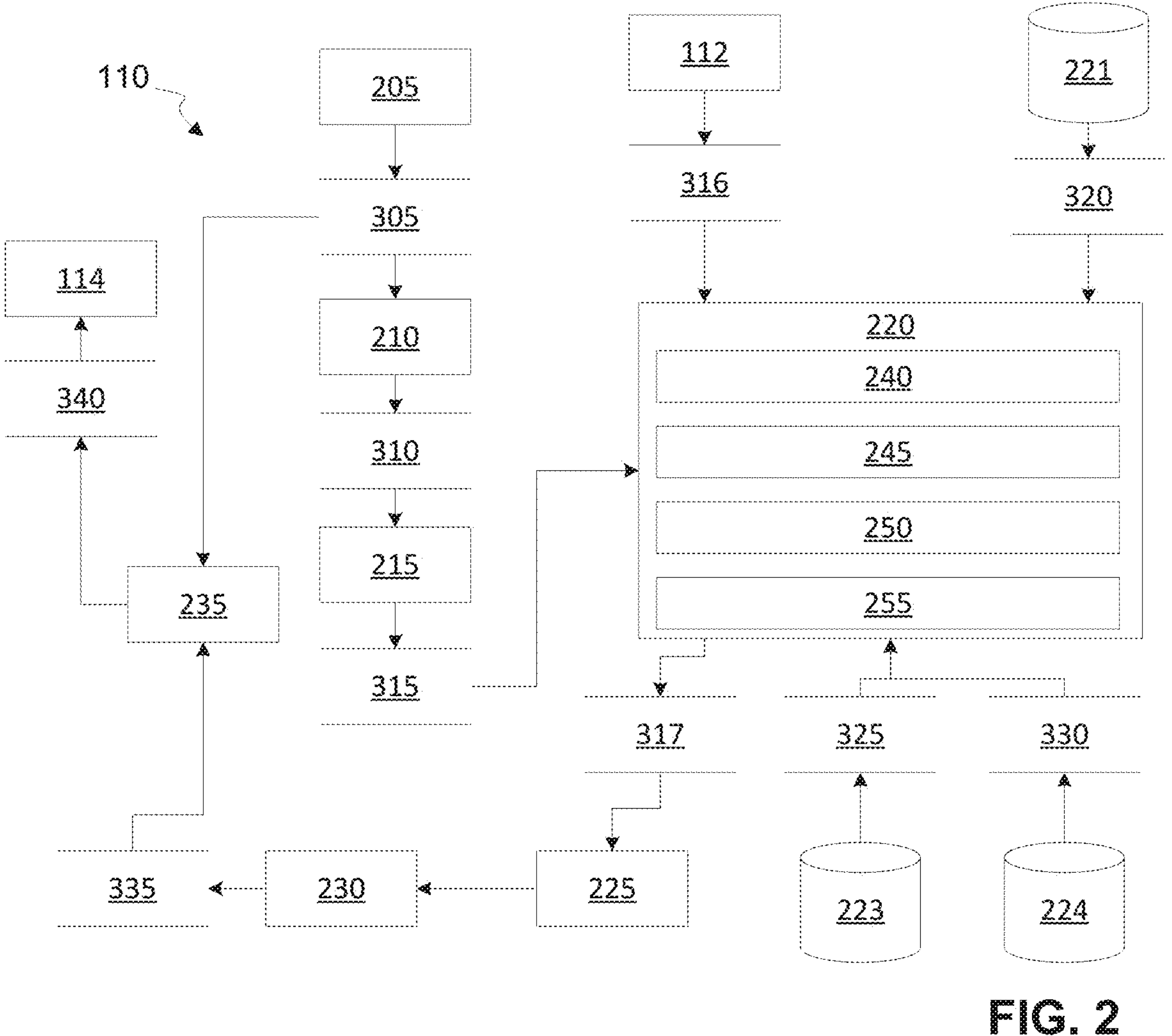
FIG. 2 is a dataflow diagram illustrating the control system of the aircraft of FIG. 1, in accordance with various embodiments.

Referring now to FIG. 2, and with continued reference to FIG. 1, control system 110 is illustrated in accordance with some embodiments. Control system 110 includes at least one processor and a computer readable storage device or media. The processor may be any custom made or commercially available processor, a central processing unit (CPU), a graphics processing unit (GPU), an auxiliary processor among several processors associated with control system 110, a semiconductor based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by control system 110 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals for actuator system 114 to automatically control the components of aircraft 100 based on the logic, calculations, methods, and/or algorithms. Although only one control system 110 is shown in FIGS. 1-2, embodiments of aircraft 100 may include any number of control systems 110 that communicate over any suitable communication medium or a combination of communication mediums and that cooperate to process the sensor signals, perform logic, calculations, methods, and/or algorithms, and generate control signals to automatically control features of aircraft 100. In various embodiments, one or more instructions of control system, when executed by the processor, models possible recoveries of the aircraft and tests those recoveries for Mach limits, Calibrated Airspeed limits, Angle of Attack limits, and terrain conflicts.

In the example provided, control system 110 includes a flight management system 205, a potential path generation module 210, a trajectory selection module 215, a trajectory flight condition module 220, a terrain database 221, a climb ability database 223, an aircraft limit database 224, a limit comparison module 225, a violation indicator module 230, and a recovery autopilot module 235.

Flight Management System 205 (FMS 205) manages a flight plan, as will be appreciated by those with ordinary skill in the art. In the example provided, FMS 205 generates a potential landing indicator 305 when a flight plan/clearance for aircraft 100 indicates a potential landing. For example, when an airport is entered as a waypoint in FMS 205, then FMS 205 may generate the potential landing indicator 305 when aircraft 100 approaches the airport waypoint. It should be appreciated that other criteria and modules may be utilized to generate potential landing indicator 305. For example, other modules may generate potential landing indicator 305 when landing gear is extended, when a runway is within a threshold distance from aircraft 100, or when other conditions are met that suggest a flight crew may attempt to land aircraft 100.

Potential path generation module 210 is configured to generate a plurality of trajectories 310 from which trajectory selection module 215 selects a potential aircraft path relative to a current aircraft flight condition. Each of the potential aircraft paths corresponds to a potential recovery trajectory the aircraft may fly when other potential paths become undesirable.

In the example provided, potential path generation module 210 is configured to generate the plurality of trajectories to cover at least six different directions for a potential escape recovery, such as trajectories 120*a-f*. For example, trajectories 310 may include a straight-ahead path, a straight climb path, a left climb path, a right climb path, a left descend path, and a right descend path. As will be appreciated by those with ordinary skill in the art, the dangerously low speed hazard is most significant when in a nose high condition and the overspeed hazard is most significant in the nose low condition, so nose high recoveries and nose low recoveries are modeled to provide full envelope protection. It should be appreciated that additional or alternative paths may be utilized without departing from the scope of the present disclosure.

In the example provided, potential path generation module 210 generates both a left bank trajectory and a right bank trajectory using a balance between bank angle and severity of nose high attitude, as will be appreciated by those of ordinary skill in the art. In a nose low situation, elimination of aircraft bank aids in the recovery, yet in the nose high situation, the addition of bank aids in recovery. This balance is based on what a pilot would do. For example, if the aircraft was only slightly nose high, no bank at all may be the most appropriate recovery. Most pilots will balance the amount of bank used with severity of the nose high recovery such that the termination for the recovery is smooth. The potential path generation module 210 balances the bank angle based on creating the smoothest possible recovery without conflict between nose low and nose high cases.

Potential path generation module 210 is further configured to generate a landing path of the plurality of trajectories in response to a potential landing indicator. By including the landing path, control system 110 may continue to operate as described below even during landing without disabling the trajectory evaluation. Control system 110 stays active all the way to the runway by using a "safe landing inhibit." As the aircraft nears the approach end of the runway, the system will be inhibited from commanding a recovery for ground collision threat if a safe landing is indicated. In other words, while the landing path does not violate a limit, the landing path is available for the pilot to fly. This inhibit leverages the capabilities of conventional runway overrun protection systems to identify a safe approach to a runway. Unsafe approaches will not be inhibited and full protection is retained.

Trajectory selection module 215 is configured to select a potential aircraft path 315 of trajectories 310 for trajectory flight condition module to evaluate. In the example provided, trajectory selection module 215 evaluates each potential aircraft path of trajectories 310 in turn, and is configured to select a next consecutive trajectory of the plurality of trajectories as the potential aircraft path upon a completed evaluation of a previous potential path. Trajectory selection module 215 selects each potential path of trajectories 310 to fully evaluate each potential path aircraft 100 may take.

Trajectory flight condition module 220 is configured to estimate a modeled flight condition 317 of the aircraft along the potential aircraft path. The modeled flight condition may indicate the airspeed, pitch, roll, yaw, and other conditions that may be used to determine whether aircraft 100 violates the aircraft limits. In the example provided, trajectory flight condition module 220 includes a vertical velocity module 240, an energy state module 245, an airspeed prediction module 250, and a terrain conflict module 255. Trajectory flight condition module 220 receives sensor data 316 from sensor system 112.

Vertical velocity module 240 is configured to calculate a vertical velocity of the aircraft on the potential aircraft path. For example, vertical velocity module 240 may calculate the vertical velocity based on a vector velocity and a descent angle provided by sensor system 112.

Energy state module 245 is configured to calculate an energy state of the aircraft on the potential aircraft path. Energy modeling permits accurate prediction of Mach, Airspeed, and Angle of Attack along the potential aircraft path. Multiple trajectories executing in faster than real time can be taxing on the processor, so the energy modeling is performed using a simple, accurate, and fast algorithm.

Energy state module 245 is further configured to calculate the energy state based on a rate of climb of the aircraft at full power and on a rate of descent of the aircraft at idle power. Specifically, energy state module 245 utilizes interpolation between two parameters. The first parameter is the rate of climb at full power and the second is the rate of descent at idle power. These two parameters define the entire span of energy gain/loss of the aircraft. The parameters are computed using table lookup or simplified modeling based on current configuration and flight conditions.

Energy state module 245 is further configured to calculate the energy state based on a current power setting of the aircraft, a current power capability of the aircraft, a speed-brake position on the aircraft, landing gear and flap settings of the aircraft, and an engine health of the aircraft. For example, energy state module 245 may predict the future energy state of aircraft 100 by interpolating between the maximum climb rate and the idle power descent rate at specific temperatures or other conditions and accounting for the aircraft configuration. This ability to predict energy states permits accurate transition between nose high or nose low recovery and a steady climb final segment. By utilizing a maximum climb rate and idle descent rate based at least in part on engine failure status, control system 110 provides accurate predictions whether all engines are operating or if engine failure occurs. Since the transition between nose high recovery or nose low recovery and final segment climb is determined by energy state, control system 110 can accurately model a nose high recovery even while nose low. For example, if in level flight above the single-engine service ceiling and an engine fails while near an aircraft limit, control system 110 will predict and execute a nose high recovery even though the nose is level or nose low. This is because at level flight above the single engine service ceiling, the aircraft is energy deficient and should descend even to avoid terrain. In some embodiments, the system uses a constant energy plane and a constant altitude to distinguish between nose high unusual attitudes and nose low unusual attitude. Accordingly, control system 110 may accurately avoid terrain that is above the single engine service ceiling of the aircraft while the aircraft is conducting a single engine drift down maneuver, as will be appreciated by those of ordinary skill in the art.

Airspeed prediction module 250 is configured to estimate an airspeed of the aircraft on the potential aircraft path based on the vertical velocity and the energy state. For example, airspeed prediction module 250 may find the difference between climb capability and the vertical velocity, then use throttle position to calculate a change in airspeed.

In some embodiments, each trajectory is evaluated by looping the following algorithm:

- Begin Loop
  - Model Recovery Autopilot response
  - Adjust aircraft state to reflect autopilot response
  - Extend trajectory 1 time slice
  - Compute vertical velocity based on model trajectory
  - Compute energy gain/loss given current conditions/power/speedbrake)
  - Adjust model energy based on vertical velocity and energy gain/loss
  - Compute airspeed and Mach of new energy state
  - Test new condition for limits violation -continued

- Min Speed Limit
- Mach Limit
- Max Speed Limit
- Terrain Clearance
- Loop until aircraft is clear Terrain database 221 stores terrain data 320 for use by terrain conflict module 255. For example, terrain database 221 may utilize conventional commercially available terrain data that indicates the height and location of terrain. Terrain conflict module 255 is configured to determine whether the potential aircraft path indicates a terrain conflict.

Climb ability database 223 stores climb ability data 325. In the example provided, climb ability data 325 is the climb rate at full power and the descent rate at idle power of aircraft 100 at specific conditions, such as at specific temperatures and altitude.

Aircraft limit database 224 stores aircraft limit data 330. As used herein, the term "aircraft limit" means flight condition limits such as Mach limits, maximum airspeed limits, minimum airspeed limits, angle of attack limits, and other similar limits of aircraft performance. As used herein, the term "aircraft limit" specifically excludes terrain conflicts.

In the example provided, predetermined passenger comfort limits are the aircraft limits. For example, the limits are sufficiently aggressive to be nuisance free yet still provide protection while preventing injury to unsecured passengers. The recovery relies on auto-pilot like maneuvers with roll onset rates constrained and limited g-loading to prevent large lateral and vertical accelerations in the cabin. Use of bank during the recovery aids in minimizing nuisances without imposing additional accelerations on the passengers.

In some embodiments, aircraft capability limits are the aircraft limits. For example, the aircraft capability limits permit greater accelerations and loading than are permitted by passenger comfort limits.

Limit comparison module 225 is configured to determine whether the modeled flight condition violates aircraft limits. For example, if an airspeed of aircraft 100 along the potential path is indicated as exceeding a maximum airspeed of the aircraft limits, then limit comparison module 225 will determine that the modeled flight condition violates aircraft limits.

Violation indicator module 230 is configured to generate an indication of impending violation 335 based on the limit comparison. In the example provided, violation indicator module 230 is further configured to generate the indication of impending violation based on the terrain conflict. In some embodiments, the indication of impending violation 335 may be conveyed to the flight crew by visual representation on a display in a flight deck of aircraft 100.

Recovery autopilot module 235 is configured to guide the aircraft along the selected trajectory in response to the selected trajectory being a last trajectory of the plurality of trajectories to lack a violation indication. For example, if five of six modeled trajectories have an indication of violation, recovery autopilot module 235 will command aircraft 100 to fly along the remaining modeled trajectory when that trajectory has an indication of impending violation. To command the flight, recovery autopilot module 235 may send control commands 340 to actuator system 114 to manipulate control surfaces of aircraft 100.

As will be appreciated by those of ordinary skill in the art, if the aircraft experiences a serious upset from windshear or other factors that place the aircraft in a near inverted case while at extreme bank angles, control system 110 is configured to determine which way to roll out for recovery by generating potential paths for each direction. For example, if in right bank but nearly inverted and still rolling right, control system 110 will evaluate a potential path that rolls through the inverted attitude to wings level. Control system 110 then commences a nose low recovery, arresting the roll and initiating roll in the shorted direction to commence the recovery. By commanding the selected trajectory, control system 110 ensures that the evaluated trajectory is the recovery flown by aircraft 100. For example, when the recovery trajectory predicts a roll through recovery, the recovery autopilot executes a roll-through recovery rather than a non-roll through recovery.

In the example provided, recovery autopilot module 235 is configured to guide the aircraft using the algorithm:

- If Nose high (Losing Speed) or Insufficient Maneuver margin:
  - Commanded g = 0.8 g
  - Commanded Bank = +60/−60 (as directed by TPA) Until Rollout Point
  - Commanded Power = Full
  - Commanded Speedbrake = retract
- If Nose Low (Gaining Speed)
  - Commanded g = 1.2 g (0.8 g if bank >90)
  - Commanded Bank = 0 (roll through in TPA directed direction)
  - Commanded Power = Idle
  - Commanded Speedbrake = Hold
- Speed Constant (within desired margin)
  - Commanded g = Speed on elevator for Vclimb
  - Commanded Bank = −30, 0, +30 (as directed by TPA)
  - Commanded Power = Full
  - Commanded Speedbrake = retract While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. An avionics system for an aircraft, the system comprising:

a potential path generation module configured to generate a plurality of possible recovery trajectories for the aircraft, each of the plurality of possible recovery trajectories describing a potential aircraft path relative to a current flight condition;

a trajectory selection module configured to select a possible recovery trajectory from the plurality of possible recovery trajectories;

an energy state module configured to calculate an energy state of the aircraft on the potential aircraft path of the selected possible recovery trajectory;

a trajectory flight condition module configured to estimate a modeled flight condition of the aircraft along the potential aircraft path of the selected possible recovery trajectory based at least in part on the calculated energy state of the aircraft on the potential aircraft path, where the modeled flight condition of the aircraft includes at least an estimate an airspeed of the aircraft on the potential aircraft path;

a limit comparison module and an aircraft limit database configured to determine whether the modeled flight condition violates an aircraft limit along the potential recovery trajectory; and a recovery autopilot module configured to guide the aircraft along one of the plurality of possible recovery trajectories in response to the one of the plurality of possible recovery trajectories being a last trajectory of the plurality of possible recovery trajectories to lack a violation of an aircraft limit along the potential recovery trajectory.

2. The avionics system for an aircraft of claim 1, wherein:

the trajectory selection module is further configured to repeatedly select a next possible recovery trajectory from the plurality of possible recovery trajectories, and for each selected next possible recovery trajectory:

the energy state module is configured to calculate an energy state of the aircraft on the potential aircraft path of the selected next possible recovery trajectory;

the trajectory flight condition module is configured to estimate a modeled flight condition of the aircraft along the potential aircraft path of the selected next possible recovery trajectory based at least in part on the calculated energy state of the aircraft on the potential aircraft path, where the modeled flight condition of the aircraft includes at least an estimate an airspeed of the aircraft on the potential aircraft path; and the limit comparison module and the aircraft limit database are configured to determine whether the modeled flight condition violates an aircraft limit along the potential recovery trajectory.

3. The avionics system for an aircraft of claim 1, wherein the plurality of possible recovery trajectories for the aircraft comprises at least six possible recovery trajectories, each of the at least six possible recovery trajectories describing a different potential aircraft path relative to the current flight condition.

4. The avionics system for an aircraft of claim 1, further comprising a violation indicator module configured to generate an indication of impending violation responsive to determining the modeled flight condition violates an aircraft limit.

5. The avionics system for an aircraft of claim 1, wherein the aircraft limit comprises at least one of a maximum speed limit, a minimum speed limit, a Mach limit, and a terrain clearance limit.

6. The avionics system for an aircraft of claim 1, further comprising a vertical velocity module configured to calculate a vertical velocity of the aircraft on the potential aircraft path of the selected possible recovery trajectory and wherein the trajectory flight condition module is further configured to estimate the modeled flight condition of the aircraft along the potential aircraft path of the selected next possible recovery trajectory further based at least in part on the calculated vertical velocity of the aircraft on the potential aircraft path.

7. The avionics system for an aircraft of claim 1, wherein the energy state module is configured to calculate the energy state of the aircraft on the potential aircraft path of the selected possible recovery trajectory based at least in part on a rate of climb of the aircraft at full power and on a rate of descent of the aircraft at idle power.

8. The avionics system for an aircraft of claim 1, wherein the energy state module is configured to calculate the energy state of the aircraft on the potential aircraft path of the selected possible recovery trajectory based at least in part on a current power setting of the aircraft, a current power capability of the aircraft, a speedbrake position on the aircraft, a landing gear setting, a flap setting, and an engine health of the aircraft.

9. The avionics system for an aircraft of claim 1, wherein the energy state module is configured to calculate the energy state of the aircraft on the potential aircraft path of the selected possible recovery trajectory and estimate the modeled flight condition of the aircraft along the potential aircraft path of the selected possible recovery trajectory for each time slice in the selected possible recovery trajectory.

10. An avionics system for an aircraft, the avionics system including at least one processor configured to:

generate a plurality of possible recovery trajectories for the aircraft, each of the plurality of possible recovery trajectories describing a potential aircraft path relative to a current flight condition;

repeatedly select a possible recovery trajectory from the plurality of possible recovery trajectories, and for the selected possible recovery trajectory:

calculate an energy state of the aircraft for time slices along the potential aircraft path of the selected possible recovery trajectory;

estimate a modeled flight condition of the aircraft for the time slices along the potential aircraft path of the selected possible recovery trajectory based at least in part on the calculated energy state of the aircraft on the potential aircraft path, where the modeled flight condition of the aircraft includes at least an estimate an airspeed of the aircraft for the time slices along the potential aircraft path; and determine whether the modeled flight condition violates an aircraft limit along the potential recovery trajectory; and guide the aircraft along one of the plurality of possible recovery trajectories in response to the one of the plurality of possible recovery trajectories being a last trajectory of the plurality of possible recovery trajectories to lack a violation of an aircraft limit along the potential recovery trajectory.

11. The avionics system of claim 10, wherein the plurality of possible recovery trajectories for the aircraft comprises at least six possible recovery trajectories, each of the at least six possible recovery trajectories describing a different potential aircraft path relative to the current flight condition.

12. The avionics system of claim 10, wherein the aircraft limit comprises at least one of a maximum speed limit, a minimum speed limit, a Mach limit, and a terrain clearance limit.

13. The avionics system of claim 10, wherein the at least one processor is further configured to calculate a vertical velocity of the aircraft on the potential aircraft path of the selected possible recovery trajectory and wherein the at least one processor is configured to estimate the modeled flight condition of the aircraft along the potential aircraft path of the selected next possible recovery trajectory further based at least in part on the calculated vertical velocity of the aircraft on the potential aircraft path.

14. The avionics system of claim 10, wherein the at least one processor is configured to calculate the energy state of the aircraft on the potential aircraft path of the selected possible recovery trajectory based at least in part on a rate of climb of the aircraft at full power and on a rate of descent of the aircraft at idle power.

15. The avionics system of claim 10, wherein the at least one processor is configured to calculate the energy state of the aircraft on the potential aircraft path of the selected possible recovery trajectory based at least in part on a current power setting of the aircraft, a current power capability of the aircraft, a speedbrake position on the aircraft, a landing gear setting, a flap setting, and an engine health of the aircraft.

16. The avionics system of claim 10, wherein the at least one processor is configured to calculate the energy state of the aircraft on the potential aircraft path of the selected possible recovery trajectory and estimate the modeled flight condition of the aircraft along the potential aircraft path of the selected possible recovery trajectory for each time slice in the selected possible recovery trajectory.

17. An aircraft comprising:

a sensor system configured to provide aircraft flight condition data;

an actuator system configured to manipulate control surfaces of the aircraft; and a control system comprising at least one processor configured to:

generate a plurality of possible recovery trajectories for the aircraft, each of the plurality of possible recovery trajectories describing a potential aircraft path relative to a current flight condition;

select a possible recovery trajectory from the plurality of possible recovery trajectories, and for the selected possible recovery trajectory:

calculate an energy state of the aircraft on the potential aircraft path of the selected possible recovery trajectory;

estimate a modeled flight condition of the aircraft along the potential aircraft path of the selected possible recovery trajectory based at least in part on the calculated energy state of the aircraft on the potential aircraft path, where the modeled flight condition of the aircraft includes at least an estimate an airspeed of the aircraft on the potential aircraft path;

determine whether the modeled flight condition violates an aircraft limit along the potential recovery trajectory; and guide the aircraft along one of the plurality of possible recovery trajectories in response to the one of the plurality of possible recovery trajectories being a last trajectory of the plurality of possible recovery trajectories to lack a violation of an aircraft limit along the potential recovery trajectory.

18. The aircraft of claim 17, wherein the at least one processor is further configured to calculate a vertical velocity of the aircraft on the potential aircraft path of the selected possible recovery trajectory and wherein the at least one processor is configured to estimate the modeled flight condition of the aircraft along the potential aircraft path of the selected next possible recovery trajectory further based at least in part on the calculated vertical velocity of the aircraft on the potential aircraft path.

19. The aircraft of claim 17, wherein the at least one processor is configured to calculate the energy state of the aircraft on the potential aircraft path of the selected possible recovery trajectory based at least in part on a rate of climb of the aircraft at full power and on a rate of descent of the aircraft at idle power.

20. The aircraft of claim 17, wherein the at least one processor is configured to calculate the energy state of the aircraft on the potential aircraft path of the selected possible recovery trajectory and estimate the modeled flight condition of the aircraft along the potential aircraft path of the selected possible recovery trajectory for each time slice in the selected possible recovery trajectory.

* * * * *